COLOR TELEVISION RECEIVER CONTROL APPARATUS

Filed Feb. 13, 1961 2 Sheets-Sheet 1

INVENTORS
WARREN H. MOLES &
ROLAND N. RHODES
BY
W. H. Sprangle
Attorney

COLOR TELEVISION RECEIVER CONTROL APPARATUS

Filed Feb. 13, 1961 2 Sheets-Sheet 2

INVENTORS
WARREN H. MOLES &
ROLAND N. RHODES
BY
ATTORNEY 3,135,826
COLOR TELEVISION RECEIVER CONTROL APPARATUS

Warren H. Moles, Trenton, and Roland N. Rhodes, Levittown, N.J., assignors to Radio Corporation of America, a corporation of Delaware
Filed Feb. 13, 1961, Ser. No. 88,968
9 Claims. (Cl. 178—5.4)

This invention relates generally to color television receivers and, particularly, to new and improved control apparatus therefor.

The standard composite color television signal supplied to color television broadcast receivers includes a luminance component, and a chrominance component comprising color subcarrier waves phase and amplitude modulated in accordance with hue and saturation. The standard signal additionally includes, for the purposes of synchronizing the recovery of color information from the modulated color subcarrier waves in the receiver, periodically recurring bursts of color subcarrier frequency oscillations of reference phase and amplitude.

In color television receiver design, it is customary to provide a chrominance channel for amplification of the modulated color subcarrier waves prior to their application to suitably synchronized demodulating apparatus. The color information recovered by the demodulating apparatus from the chrominance channel output is suitably combined with luminance information separately amplified in a luminance channel in order to reconstitute the televised color image.

When the color synchronizing burst is absent from the received composite signal, as in black and white broadcasts, or is very low in amplitude for a variety of possible reasons, it is recognized as desirable to disable the color signal processing circuitry, as by cutting off the chrominance channel, whereby the receiver reproduces a black and white image only. This function is commonly designated as the "color killer" function.

While the usual color television receiver incorporates automatic gain control apparatus akin to that employed in the usual black and white television receivers for the usual purposes, it has been recognized that it may be additionally desirable to supplement such overall gain control of the composite signal with a selective gain control of the chrominance channel. The saturation of colors in the image reproduced by the receiver is dependent upon the ratio of amplitudes of the color subcarrier waves and the luminance signal component. There are a number of factors which may cause an undesired variation in such ratio, which variations will not be corrected by any overall gain control of the composite signal. To eliminate such undesired variations, the additional selective gain control of the chrominance channel is thus often provided, with reliance on the reference amplitude color synchronizing bursts to supply the control information. This selective gain control function is commonly designated as the "automatic chroma control" (ACC) function.

In a straightforward approach to the accomplishment of both the color killer and automatic chroma control functions in the chrominance channel of a given receiver, there has been employed a two-stage chrominance amplifier; the gain of the first chrominance amplifier stage is controlled in accordance with burst amplitude to accomplish the automatic chroma control function, while the second chrominance amplifier stage is subject to disabling or enabling in accordance with the absence or presence of synchronizing bursts of significant amplitude in the received signal. With this two-stage approach, it is usual to supply the burst separator input from the output of the first chrominance amplifier stage, whereby the path for bursts when received is continually available to accomplish "unkilling" when the receiver stands in a killed condition.

In U.S. Patent No. 2,894,061, issued to C. B. Oakley and R. N. Rhodes on July 7, 1959, circuitry is described whereby both of the color killer and automatic chroma control functions may be accomplished in a single chrominance amplifier stage, and in response to a single control voltage input. Associated techniques are described whereby the problem of providing a path for bursts when received to accomplish unkilling of a receiver standing in a killed condition is solved despite the accomplishment of both functions in the same stage. The control voltage responsive amplifier stage in the Oakley and Rhodes patent acts as a "self-killing" circuit, thereby eliminating the need for conventional color killer tubes and associated circuitry. The particular circuitry disclosed in the Oakley and Rhodes patent exploits that characteristic of an amplifier including a controlled electron flow path device of the "constant current" type (e.g., a pentode vacuum tube or semiconductor amplifier) whereby the gain of the amplifier is a function of the output electrode (e.g., anode or collector) voltage below a certain voltage level. In accordance with one specific form of the Oakley and Rhodes invention, an otherwise conventional pentode-type chrominance amplifier which is subject to automatic chroma control is provided with a direct current impedance in its anode circuit. This impedance is of such value that, as the ACC voltage varies the amplifier bias from a normal negative value for color signal reception to a substantially less negative value during reception of a monochrome signal, the operating point of the pentode is shifted below the knee of its characteristic curve. Thus, the anode voltage and, therefore, the amplifier gain are changed from a normal condition to a substantially inoperative one, thereby effectively disabling the color channel of the receiver.

In a copending application, Serial No. 88,961, of Albert Macovski, entitled "Chrominance Channel Control Apparatus," concurrently filed herewith, and now U.S. Patent No. 3,070,654, issued December 25, 1962, there is described an improvement on the Oakley and Rhodes circuits. In operation, it achieves functions similar to those achieved by the Oakley and Rhodes circuitry; i.e., a control voltage responsive to the amplitude of the color synchronizing bursts is applied to the input circuit of a chrominance amplifier stage to control its gain inversely with respect to burst amplitude, the gain increasing with decreasing burst amplitude until arrival at a predetermined threshold value, whereupon the amplifier stage cuts itself off. The achievement of cut-off of the amplifier stage when gain exceeds a certain value is, however, achieved in a different manner than that shown in the Oakley and Rhodes patent. The novel manner of achieving this effect requires the presence in the amplifying tube of a second control grid or a suppressor grid having a control characteristic. The bias on this additional grid is made responsive to the D.C. voltage on the screen grid of the amplifying tube, as by resistive coupling therebetween. As the gain of the amplifying tube increases with decreasing burst amplitude, the screen grid draws an increasing amount of current, lowering the screen voltage and driving the additional grid in a negative direction. When the additional grid goes sufficiently negative, plate current is cut off and all of the cathode current is diverted to the screen grid. The killing action is regenerative since diversion of current to the screen causes an increase in screen current which further decreases the voltage on the additional grid to increase the diversion. As a result of this regenerative feature, a sharp, positive switching action highly desirable for color killing is achieved. This sharp cut off action is accomplished in the Macovski circuits without detracting from the many desirable advantages of the general approach of the Oakley et al. patent, i.e., the accomplishment of both color killer and ACC functions in a single stage requiring only a single control voltage input, the elimination of the conventional color killer tube and associated circuitry, etc.

To assure the ability to unkill the chrominance channel once it has been placed in a killed condition, several approaches are suggested in the Macovski patent. The burst separator input may be derived from the screen grid circuit of the controlled amplifying stage; since screen current is not cut off when the channel is in the killed condition, the burst channel is open even under the killed condition, whereby a path for the bursts when received is available to develop an enabling voltage when required. Another approach is to supply positive pulses to the additional grid in time coincidence with the burst interval whereby an output may be developed in the plate circuit during the burst interval even in the killed condition; with such an arrangement, the burst separator input may be coupled to the plate circuit of the controlled amplifier stage.

An analogous choice of approaches is also available in use of the circuits of the Oakley and Rhodes patent; that is, the burst separator input may be coupled to the plate circuit of the controlled amplifier stage, with reliance on keying to regularly activate the plate circuit during burst intervals, or the burst separator input may be coupled to the screen grid of the controlled amplifier, whereby the requirement of keying may be eliminated.

It may be noted that where the ACC function is to be performed based on information derived from the burst separator, it appears preferable to derive the burst separator input from the plate circuit (from which the demodulator inputs are derived), because for many tubes, the screen and plate voltage variations with grid bias do not necessarily track.

In addition to the above discussed ACC and color killer functions desirably performed in a color television receiver, there are additional functions desirably performed in a color television receiver, the description of which is pertinent to an explanation of the present invention. In U.S. Patent No. 2,835,728 issued to R. D. Flood et al. on May 20, 1958, and entitled "Television Receiver With Color Signal Gate," it is pointed out that it is desirable to prevent the color demodulators of a color television receiver from supplying signals corresponding to a demodulated burst to the color image reproducer. To prevent such a result, the Flood et al. patent describes circuitry serving to prevent the application of bursts to the color demodulators.

In U.S. Patent No. 2,901,534, issued to C. B. Oakley on August 25, 1959, and entitled "D.C. Stabilized Amplifier," it is recognized that stabilization of the D.C. operating point of the matrix amplifiers of a color television receiver may be simply achieved by driving the grid-cathode diode of each amplifier tube into conduction during succeeding retrace intervals. By this means, the D.C. current in each amplifier tube is rendered substantially insensitive to effects of tube aging, cathode aging, variations in cathode temperature, tube replacement, etc., and color difference signals are suplied by the matrix amplifier tubes to the color image reproducer with the proper D.C. component.

In practice, color television receivers have been designed to utilize pulsing apparatus to serve the purposes just discussed with respect to the Flood et al. and Oakley patents. Thus, for example, in the RCA CTC-10 receiver (presented in detail in the RCA Service Data Pamphlet No. 1960 T-5), a so-called blanker tube is caused to respond to horizontal flyback pulses derived from the receiver's deflecting circuits. A positive-going blanking pulse developed in the cathode circuit of the blanker tube is applied to the cathode of the chrominance amplifier tube to drive the tube to cut-off during a substantial portion of the retrace interval inclusive of the burst interval. This accomplishes the result desired in the Flood et al. patent by preventing the application of bursts to the color demodulators. A negative-going blanking pulse output is derived from the anode circuit of the blanker tube and applied in common to the cathodes of the matrix amplifier tubes, to accomplish the D.C. stabilization purposes referred to in the Oakley patent. The two described functions of the blanker tube in this receiver complement each other in that blanking of the chrominance amplifier during the retrace interval results in the provision of an input signal to the matrix amplifying tubes which is substantially "clean" (i.e., free of variations) during the application of the stabilizing pulses. Also, in the CTC-10 color receiver, the outputs of the matrix amplifiers are D.C. coupled to the respective control grids of the color kinescope; the pulsing of the matrix amplifier tubes into grid current conduction during the retrace interval additionally serves to drive the color kinescope control grids in a negative direction so as to produce blanking of the kinescope beams during the horizontal retrace intervals.

The present invention is directed to circuitry for achieving functions of the type discussed above with respect to the Flood et al. and Oakley patents in color television receivers employing the approach to performance of ACC or color killer functions or both typified by the previously discussed Oakley et al. patent and Macovski patent. A conflict arises in the direct approach to achievement of the aforesaid goal. Thus, for example, the unkilling requirement imposed on the chrominance amplifier stage dictates the maintaining of the chrominance amplifier in a conducting condition during burst intervals; however, the purposes of the Flood et al. patent would be directly served by cutting off the chrominance amplifier during the burst interval. Likewise, for optimum operation of matrix amplifier stabilizing circuitry in accordance with the Oakley patent purposes, cutting off of the chrominance amplifier during the retrace interval is appropriate. To solve the conflict noted above, the present invention differentiates between two portions of a retrace interval: an "early" portion, and a "late" portion. The "late" portion of the retrace interval corresponds to the time period occupied by the color synchronizing bursts; the "early" portion of the retrace interval corresponds to the retrace interval period preceding that occupied by the bursts. Different actions in the same stage are achieved in the "early" and "late" retrace interval portions.

In accordance with a particular embodiment of the present invention, respective "early" and "late" actuating pulses are separately derived from a retrace interval pulse source, such as a deflection circuit source of flyback pulses. A controlled chrominance amplifier of the type disclosed in the Macovski patent is cut off during the "early" retrace interval portion by application of "early" pulses to the chrominance amplifier tube's cathode circuit. Passage of bursts to the plate circuit of this amplifier tube is, however, assured, even in a killed condition, by the application of "late" pulses to the amplifier tube's third grid. Stabilization of the receiver's matrix amplifier is achieved by application of suitable "early" pulses thereto; additionally, "late" pulses are also applied thereto serving to prevent actuation of the color image reproducer by demodulated bursts, and completing the retrace blanking of the image reproducer. "Late" pulses also serve as suitable keying pulses for the burst separator and color killer detector.

A primary object of the present invention is to provide novel and improved color television receiver control apparatus.

A particular object of the present invention is to provide a novel system for conjointly performing functions of D.C. stabilization, reproducer blanking, color killing and unkilling, and automatic chroma control.

Other objects and advantages of the present invention will be readily appreciated by those skilled in the art after a reading of the following detailed description and an inspection of the accompanying drawing in which.

Figure 1:
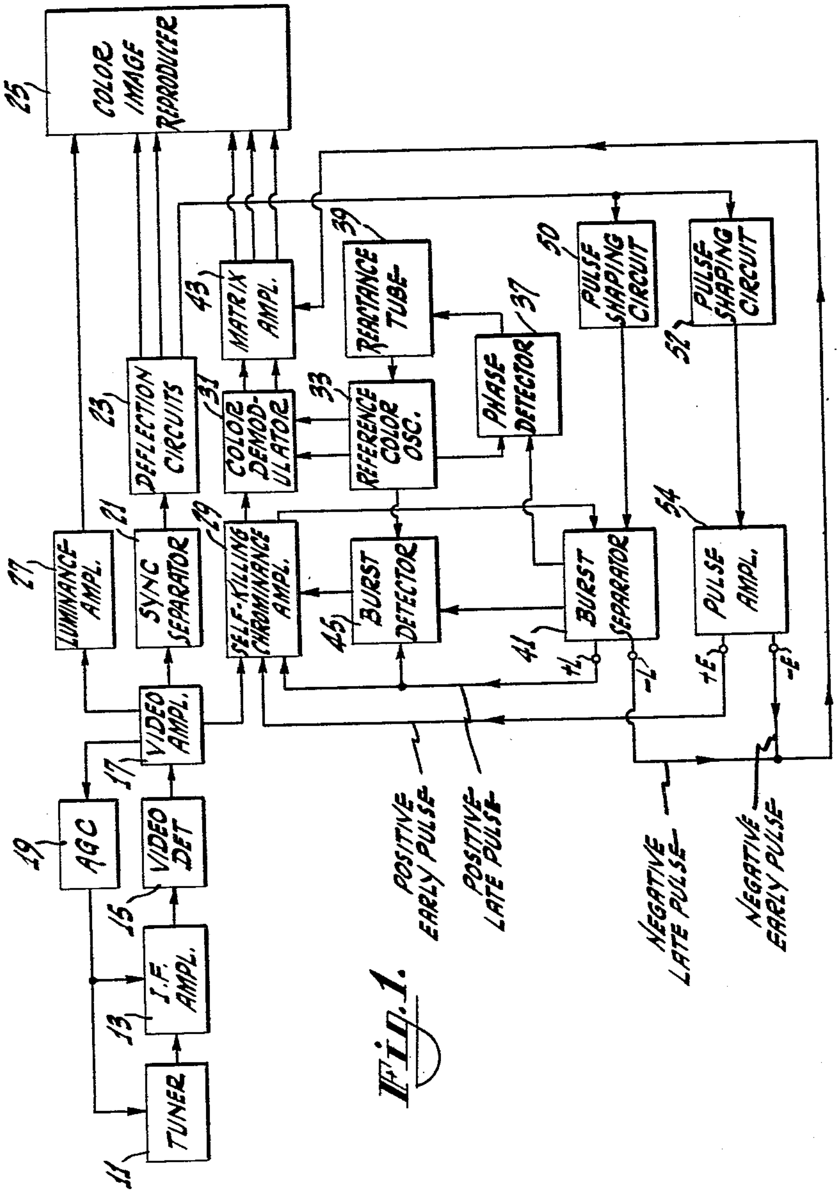
FIGURE 1 illustrates in block diagram form a color television receiver incorporating apparatus in accordance with an embodiment of the present invention.

In FIGURE 1, the head end of the illustrated color television receiver comprises a tuner 11, which responds to the reception of broadcast television signals to produce intermediate frequency signals bearing composite television signal modulation, which signals are supplied to the intermediate frequency (IF) amplifier 13. The IF amplifier 13 output is supplied to a video detector 15, which demodulates the modulated IF carrier to recover a composite video signal. A separate detector (not illustrated) may be conventionally provided to also respond to the IF amplifier 13 output to provide, in accordance with well known intercarrier sound techniques, a sound IF signal for driving the receiver's sound channel (also not illustrated).

The output of the video detector 15 is supplied to a video amplifier 17 which amplifies the detected composite video signal, and supplies the amplified signals to a number of the operating circuits of the receiver. One of the outputs of video amplifier 17, for example, is supplied to automatic gain control apparatus 19, which may be of the well known keyed AGC variety, responding to variations in the amplitude of the deflection synchronizing pulses of the detected composite signal to produce a control potential which is used to control the gain of amplifying stages in the tuner 11 and IF amplifier 13 in a direction compensating for such variations. Another output of video amplifier 17 is applied to a sync separator 21 which separates respective horizontal and vertical deflection synchronizing pulses from the detected composite signal, the separated pulses being supplied to deflection circuits 23 to suitably synchronize the generation of deflection waves used to develop a scanning raster in the color image reproducer 25.

Another output of video amplifier 17 is supplied to a luminance amplifier 27, which serves to amplify the luminance component of the composite signal for application to the reproducer 25. Where the reproducer 25 takes the form of the well known three-beam, shadow-mask color kinescope, the luminance (Y) signal output of amplifier 27 may be conventionally applied in common to the cathodes of the three electron guns of the color kinescope. Another output of the video amplifier 17 is applied to a chrominance amplifier 29, which has a bandpass characteristic for selectively amplifying the chrominance component of the detected composite signal, the chrominance component comprising the color subcarrier and its sidebands. The chrominance amplifier 29 output is applied to color demodulators 31 for synchronous demodulation of the color subcarrier to produce color-difference signal outputs. To effect the desired synchronous demodulation, a local source of unmodulated subcarrier frequency waves of a reference phase is required. Such a source is constituted by reference color oscillator 33, which nominally operates at the color subcarrier frequency, and which is controlled in frequency and phase by AFPC (automatic frequency and phase control) apparatus, comprising a phase detector 37 comparing the oscillator 33 output with received color synchronizing bursts to derive control information for adjusting a reactance tube 39 associated with the frequency determining circuits of the oscillator 33.

The color synchronizing burst input to the phase detector 37 is supplied from a burst separator 41, which comprises a gate circuit coupled to the output of chrominance amplifier 29 and controlled by suitably timed gating pulses (derived from the deflection circuits 23 in a manner to be subsequently described) to pass signals only during the recurring time intervals occupied by the color synchronizing bursts.

Where the color image reproducer 25 is of the aforementioned three-beam, shadow-mask color kinescope type with luminance-driven cathodes, it is usual to require the chrominance information supplied to the reproducer to be in the form of red, green and blue color-difference signals ($R-Y$, $G-Y$ and $B-Y$) for separate application to respective ones of the control grids of the kinescope's three electron guns. While signals of such form may be derived from the modulated color subcarrier waves directly through the use of three demodulators operating at the respective phases associated with these color difference signals, it is common practice, for a variety of reasons including circuit economy, to rather utilize only two color demodulators with subsequent matrixing apparatus for converting the demodulator outputs to the desired signal forms. In accordance with such practice, the illustrated receiver employs a matrix amplifier 43, operating on the outputs of demodulators 31 to develop the desired color difference inputs for the color image reproducer 25.

For further details of a receiver of the general type described above, reference may be made, for example, to the previously mentioned RCA Service Data Pamphlet No. 1960 T–5, illustrating the CTC–10 color television receiver chassis manufactured by the Radio Corporation of America.

The chrominance amplifier 29 of FIGURE 1 is self-killing, as in the previously discussed Oakley et al. patent and Macovski patent. A control voltage is supplied thereto to vary the amplifier gain in inverse relation to the amplitude of the burst component appearing at its output; when gain of the amplifier 29 is increased beyond a given level in response to disappearance or appreciable diminution of the burst, the amplifier 29 is caused to respond in a manner disabling its function of supplying amplified chrominance signals to the color demodulators 31.

The source of the chrominance amplifier's gain varying control voltage is a burst detector 45, illustratively of a keyed synchronous type as shown in a copending Moles and Rhodes application, Serial No. 88,713, entitled "Burst Detector," and concurrently filed herewith. The detector 45 responds to the outputs of the burst separator 41 and the reference color oscillator 33 to effect synchronous detection of the separated burst, providing an output voltage which varies with the amplitude of separated bursts, but which is substantially unresponsive to noise (as is explained in more detail subsequently in this application, and in said copending Moles and Rhodes application).

Attention is now directed to additional components of the receiver of FIGURE 1 which are provided pursuant to the principles of the present invention. A pulse shaping circuit 52 responds to a pulse appearing in the deflection circuits 23 with a timing substantially coincident with the horizontal retrace interval; the pulse supplied to circuit 52 may, for example, be a horizontal flyback pulse developed across a widing of the horizontal output transformer of a conventional horizontal deflection circuit. Pulse shaping circuit 52 operates upon its pulse input to provide a modified pulse output, the pulse output comprising a narrowed actuating pulse occupying an early portion of the horizontal retrace interval, i.e., terminating before the later portion thereof within which the burst interval occurs. The modified pulse output of pulse shaping circuit 52 is supplied to a pulse amplifier 54, having a pair of output terminals +E and −E. At the +E output terminal of pulse amplifier 54 appears a positive polarity version of a pulse confined to the aforementioned early portion of the horizontal retrace interval, while at the −E output terminal of pulse amplifier 54 appears a negative polarity version of said "early" pulse (as these pulses will be designated hereinafter).

A pulse shaping circuit 50 also operates upon the aforementioned pulse output of deflection circuits 23, but in a manner complementary to the operation of pulse shaping circuit 52. That is, pulse shaping circuit 50, which supplies its output as a keying pulse to the burst separator 41, modifies its input pulse to cause actuation of the burst separator 41 only during a late portion of the horizontal retrace interval inclusive of the time occupied by the burst interval. The burst separator 41, in addition to providing burst outputs for application to burst detector 45 and phase detector 37, is provided with a pair of pulse output terminals, +L and —L. At the +L output terminal appears a positive polarity version of the burst separator actuating pulse, while at the —L output terminal appears a negative polarity version of said "late" pulse (as these pulses will be designated hereinafter).

In accordance with the illustrated embodiment of the present invention the positive early pulse output of pulse amplifier 54 is applied from the +E terminal to the self-killing chrominance amplifier 29 in a manner adapted to cause cut off of the chrominance amplifier 29 during the early retrace interval portion. Thus, the signal supplied by chrominance amplifier 29 to the color demodulators 31, and in turn the demodulated output of demodulators 31 as supplied to matrix amplifier 43, are effectively blanked during the early retrace interval portion.

The positive late pulse output of burst separator 41 is applied from terminal +L to the chrominance amplifier 29 in a manner assuring conduction by the chrominance amplifier during the late retrace interval portion, even when the amplifier 29 stands in the killed condition due to the nature of the bias supplied to it by burst detector 45. This late pulse application assures that a signal path will be available through the chrominance amplifier 29 to the burst separator 41, even when the chrominance amplifier has been killed, whereby reappearance of bursts with the proper amplitude in the received signal can achieve unkilling of the amplifier 29. The positive late pulse output of burst separator 41 is also utilized as a keying pulse for operation of the keyed burst detector 45. Utilization of such a keying pulse for operation of a burst detector will be described in more detail subsequently.

The negative late pulse output of burst separator 41 appearing at the —L output terminal thereof, and the negative early pulse output of pulse amplifier 54 appearing at the —E terminal thereof, are combined and applied to matrix amplifier 43 in a sense enhancing conduction in the matrix amplifier tubes. The relative amplitudes of the respective late and early pulse components of the combined pulse signal are such that the negative early pulse exceeds the negative late pulse and is of sufficient amplitude to cause grid current flow in the matrix amplifier tubes during the "early" interval portion. This assures that the D.C. stabilization purposes of such pulse application to the matrix amplifier tubes will be determined by occurrences during the early retrace interval portion, a time period when the signal inputs to the matrix amplifier from color demodulators 31 will be at a steady, relatively fixed level. Also, this early pulse application serves to effect blanking of the reproducer during the early retrace interval portion. The additional presence of the negative late pulse component in the combined pulse signal, however, assures that the demodulated bursts will not cause lighting of the retrace lines traced in the reproducer 25 by completing the horizontal retrace blanking therein.

It will be noted that the above described pulsing arrangementes relating to the production and utilization of "early" and "late" pulses permit achievement of proper performance of such desirable functions as D.C. stabilization of color difference signal outputs, prevention of demodulated burst display, reproducer blanking, color unkilling, etc., in a color receiver employing an ACC-color killer system of the advantageous self-killing chrominance amplifier type. For a more detailed consideration of this accomplishment, reference is now made to FIGURE 2 wherein certain pertinent portions of a color television reciever of the general form illustrated in FIGURE 1 are shown in schematic detail.

Figure 2:
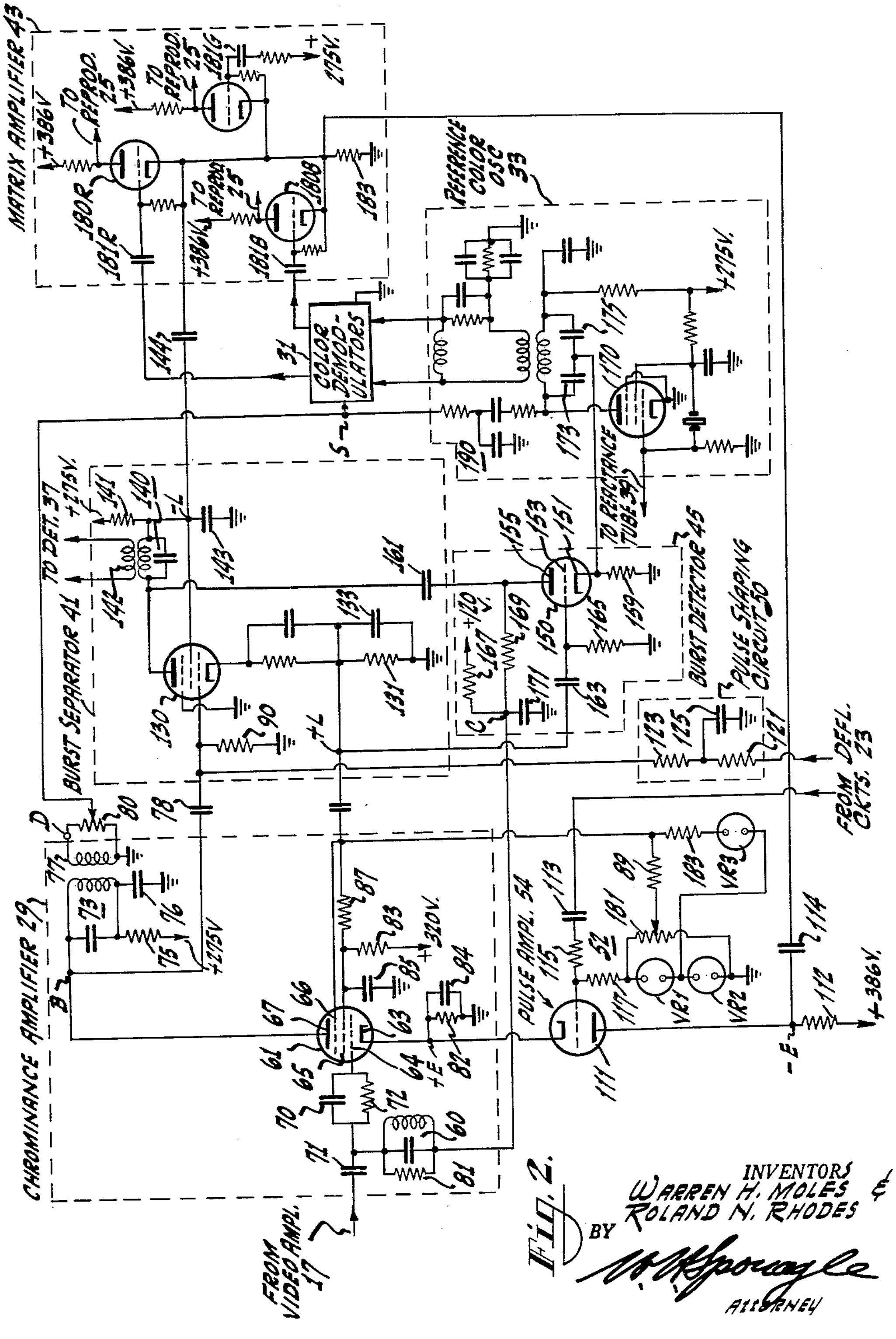
FIGURE 2 illustrates in greater schematic detail apparatus in accordance with the embodiment of FIGURE 1.

The overall organization of the circuitry of FIGURE 2 is as shown in FIGURE 1. Thus, a chrominance amplifier 29 amplifies the chrominance signal component of the video amplifier 17 output for application to color demodulators 31, and to burst separator 41. The burst separator output is applied to a phase detector 37 to achieve automatic frequency and phase control of a reference color oscillator 33. The oscillator 33 output is supplied in suitable phases to the color demodulators 31 to effect synchronous demodulation of the color subcarrier waves. The color difference signal outputs of demodulators 31 are combined in matrix amplifier 43 to obtain suitable driving signals for color reproducer 25. The circuitry specifically illustrated for matrix amplifier 43, utilizing three cathode-connected amplifier tubes 180B, 180G and 180R sharing a common cathode resistor 183, is similar to that employed in the matrix amplifier of the aforementioned RCA CTC–10 color television receiver. An explanation of the operation of this type of matrix-amplifier and the relationships to be established there with in connection with the operation of the color demodulators supplying signals to such amplifier is presented in the U.S. Patent No. 2,830,112, issued to D. H. Pritchard on April 8, 1958. The outputs of the respective matrix amplifier tubes are illustratively applied to the respective grids of a three-gun color kinescope, as in the aforementioned CTC–10 color receiver.

The chrominance signal amplifier 29 includes an amplifying device illustratively shown as a pentode 61. Chrominance signals, from an output of the video amplifier 17, are supplied to an input circuit associated with the cathode and first grid electrodes 63 and 64, respectively of the pentode 61. Specifically, the chrominance signal is applied via a path including a coupling capacitor 71 and a series grid resistor 72 (bypassed for chrominance signal frequencies by a capacitor 70). The resistor 72 serves to limit any grid current flow on positive noise peaks so as to prevent noise charge up of capacitor 71. Bandpass filtering apparatus for selecting the chrominance signal component to the relative exclusion of the low frequency luminance component of the composite color television signal processed by the video amplifier 17 is provided by a suitably tuned parallel resonant circuit 60 (shunted by a damping resistor 81) coupled between the junction of capacitor 71 and resistor 72 and the control voltage output terminal C of burst detector 45. The cathode 63 is returned to a point of reference potential (e.g., chassis ground potential) via cathode resistor 82.

A tuned output circuit is associated with the anode 67 of the chrominance amplifier tube 61, across which output circuit an amplified version of the chrominance signal input may appear. Specifically, the anode circuit of tube 61 includes a parallel resonant circuit 73 interposed in series with an anode resistor 75 in the connection of the anode 67 to a source (indicated +) of suitable positive operating potential. The anode resistor 75 is bypassed by capacitor 76. The parallel resonant circuit 73 is tuned to present an appreciable impedance at the frequencies of the chrominance signal component, and serves as further chrominance signal bandpass selection apparatus. An output winding 77 is mutually inductively coupled to the inductance element of the parallel resonant circuit 73. The chrominance signal input terminal S of color demodulators 31 is supplied with an adjustable input via its connection to the movable arm of a saturation control potentiometer 80, having its fixed terminals connected respectively to opposite ends of winding 77. A chrominance signal path to the input of the burst separator 41 is provided from the anode end of the parallel resonant circuit 73 by means of a coupling capacitor 78.

In the performance of the previously mentioned automatic chroma control function, it is desired to vary the gain of the chrominance amplifier circuit inversely with respect to the undesired variations in the chrominance signal amplitude. To achieve this desired gain control, a control voltage input, comprising a direct current voltage representative of the undesired chrominance signal variations, is applied as a variable bias to the control grid 64 of tube 61. The control voltage, developed in the burst detector 45 in a manner to be subsequently described, appears at the control voltage output terminal C, and is applied therefrom via a direct current path to the control grid 64. The control voltage, illustratively of a negative D.C. polarity, becomes less negative when the undesired chrominance signal variation causes a decrease in chrominance signal amplitude, and becomes more negative when the undesired chrominance signal variation causes an increase in chrominance signal amplitude. The bias variation introduced by the control voltage application causes a variation in the gain of the chrominance amplifier stage which tends to compensate for the undesired variation of the chrominance signal input amplitude. With the control voltage being responsive to the output of burst separator 41, in turn responsive to the output of the chrominance amplifier stage, a closed loop gain control system is provided which may serve to accurately maintain the chrominance signal input to the color demodulators 31 substantially free of undesired amplitude variations.

In the apparatus described in the aforementioned Macovski patent, means are provided in addition to those chrominance amplifier circuit components heretofore described for accomplishing the color killer function in the same chrominance amplifier stage, and utilizing as controlling information the same control voltage input which serves to provide the automatic chroma control function. To appreciate how this is accomplished, one must now consider the circuitry associated with two additional electrodes of the tube 61, viz., screen grid 65 and third grid 66. The screen grid 65 is returned to a source of positive D.C. potential by means of a resistor 83. The screen resistor 83 is bypassed for chrominance signal frequencies by capacitor 85. The third grid 66 of tube 61 is connected to an intermediate point of a voltage divider formed by the screen resistor 83, a resistor 87 providing a D.C. interconnection between the grids 65 and 66, and a resistor 89 connected between the third grid 66 and a source of negative D.C. potential.

The values of resistors 83, 87 and 89 are chosen so that, under normal gain conditions for the chrominance amplifier, the junction between resistors 87 and 89 to which third grid 66 is connected is at a suitable positive D.C. potential relative to the cathode 63. However, as the burst amplitude decreases, causing the control voltage input to grid 64 to go in the positive direction to introduce a compensating gain increase, the screen grid 65 draws an increasing amount of current. This increase in screen current causes an increased voltage drop across resistor 83. As a consequence, the junction between resistors 87 and 89 swings in a negative direction, driving the third grid 66 more negative. As the gain increase becomes sufficient to drive third grid 66 more negative than the cathode 63, the third grid 66 diverts current from the plate 67 to the screen grid 65. A regenerative action ensues, with the increased screen current driving grid 66 further in the negative direction, causing still greater diversion of current from plate to screen. As a result, the plate is quickly driven to cut-off, with substantially all of the cathode emission current flowing to the screen grid 65. Under such conditions the output circuit associated with the plate 67 is no longer supplied with the chrominance signals for application to demodulators 31, and the receiver stands in a color killed condition, the appropriate condition to be obtained when burst amplitude decreases below a useful level or when burst disappears at the beginning of monochrome transmission.

Thus, the desired color killer action is achieved in the same chrominance amplifier stage that is subjected to automatic chroma control. Indeed, a single control voltage input suffices to accomplish both functions in the controlled amplifier stage. The color killing action, furthermore, is achieved without need for a separate color killer device as usually required.

In view of the fact that the burst separator 41 derives its input from the plate 67 of tube 61, a difficulty is imposed in accomplishing the "unkilling" of the chrominance channel once it is killed. In other words, to remove the negative potential from the third grid 66 which is maintaining the plate 67 cut-off, the burst separator 41 must be able to recognize the return of a burst of appropriate amplitude whereby a control voltage may be applied to control grid 64 sufficiently more negative to reduce the screen current and start the flow of anode current. To assure such capability to effect unkilling when appropriate, keying pulses of positive polarity, timed to coincide with the burst interval, are applied to the third grid 66. Specifically, keying pulses of the desired characteristic (supplied pursuant to the principles of the present invention in a manner to be described subsequently) appear at pulse output terminal +L, which is in turn coupled via capacitor 91 to the third grid 66. The keying pulse amplitude is chosen, relative to the negative D.C. potential at which the third grid 66 is maintained during color killing by the action of the voltage divider 83, 87, 89, so that the grid 66 is driven sufficiently positively during the burst interval that any burst appearing in the input signal will be permitted to pass to the plate 67 for application to the burst separator 41. If the burst thus passed is of sufficiently large amplitude, it will cause generation of a control voltage by burst detector 45, which control voltage will be sufficiently negative when applied to control grid 64 to decrease the current drawn by screen grid 65 to a level permitting the third grid 66 to swing more positive than the cathode 63. The chrominance amplifier 29, thus, is made operative to amplify the chrominance signal.

The development of the control voltage supplied to the chrominance amplifier 29 is effected by burst detector 45. In the aforementioned copending application, Serial No. 88,713, entitled "Color Television Receiver Control Apparatus," filed concurrently herewith for W. H. Moles and R. N. Rhodes, there is presented a detailed consideration of the operation of a synchronous burst detector of the unique form specifically illustrated for detector 45 in FIGURE 2.

For present purposes, the operation of the detector 45 apparatus of FIGURE 2 may be briefly summarized as follows: Local color oscillations, derived from a capacitance divider 173—175 in the resonant plate circuit of tube 170 of oscillator 33, are applied to the cathode 151 of a triode 150, and appear across cathode resistor 159. Separated bursts from the output of burst separator 41 are applied via a capacitor 161 to the anode 155 of the triode 150. Positive-going keying pulses, derived from the pulse output terminal +L, are applied via capacitor 163 to the control grid 153 of triode 150. Grid leak bias is developed across the grid leak resistor 165, in response to the keying wave application, so as to limit conduction of the triode 150 to the time of the "late" pulse occurrences, i.e., to each burst interval. Positive plate potential is applied to anode 155 through resistors 167 and 169, the plate potential value being chosen to permit tube conduction whenever the bias is near zero.

The amplitude of the local color oscillations applied across cathode resistor 159 are chosen with respect to the tube cut-off such as to insure a small conduction angle; i.e., triode 150 is rendered conducting within the keying interval only during a small portion of each negative half cycle of the local color oscillations, the conducting portion corresponding to the negative peak of the oscillatory wave. The phase of the applied oscillations is chosen so that if bursts are present in the received signal with sufficient magnitude to synchronize oscillator 33, the bursts appear at anode 155 in a 180 degree out-of-phase relationship to the local color oscillations on cathode 151. The effect of conduction of tube 150 on the negative peaks of the local oscillations will be to clamp the positive peaks of the burst of the received bursts at a substantially zero potential. During the other portions of the burst interval when tube 150 is not conducting, the bursts will swing the anode in a negative direction away from the zero clamping potential, which results in a negative average voltage being developed across the output filter capacitor 171 and appearing at the control voltage output terminal C. The magnitude of the negative potential will vary with the degree to which the bursts swing the anode negatively away from the zero clamping potential; i.e., the negative potential developed will vary in accordance with the amplitude of the bursts. There is thus provided at terminal C a negative control potential suitable for application to the control grid 64 of the chrominance amplifier tube 61.

Among the advantages of the specific burst detector circuitry just described is substantial noise immunity. Due to the random phase relationship of noise to the local color oscillations, the long term average potential developed across output filter capacitor 171 by noise will be zero. A more detailed explanation of this point will be found in the aforementioned concurrently filed Moles and Rhodes application.

The pulse amplifier 54 of FIGURE 2 comprises a triode 111 which responds to a pulse input applied to its control grid to develop at its cathode (terminal +E) a positive polarity pulse output, appearing across cathode resistor 82 (suitably bypassed for chrominance signal frequencies by capacitor 84), and to develop at its anode (terminal —E) a negative polarity pulse output, appearing across anode resistor 112. The pulse shaping circuit 52 through which flyback pulses, derived from the deflection circuits 23, are applied to the grid circuit of the triode 111 includes coupling capacitor 113, series resistor 115 and shunt resistor 117, whose relative values are chosen to effect sufficient differentiation of the flyback pulse so that the resultant output pulses are narrowed and terminate prior to the burst interval. That is, the output pulses of the triode 111 coincide with an earlier portion of each horizontal retrace interval than that occupied by the color synchronizing burst, and thus constitute "early" pulses (pursuant to the terminology employed in describing FIGURE 1).

In contrast, the pulse shaping circuit 50 associated with the path of application of flyback pulses to the grid of burst separator tube 130 serves to develop "late" pulses. Pulses shaping circuit 50, including series resistors 121 and 123, and shunt capacitor 125, and terminating in grid leak resistor 90, provides sufficient integration of the flyback pulses to cause actuation of the burst separator tube 130 only during a portion of each horizontal retrace interval which is later than the portion associated with the triode 111 output pulses, and which later portion does include the burst interval. The burst separator 41, in addition to developing a high frequency burst output across the high frequency anode load 140 for application to phase detector 37 and burst detector 45, also serves as a source of positive and negative "late" pulse outputs for utilization in accordance with the principles of the present invention. Particularly, the burst separator tube 130 is provided with a low frequency cathode load including a cathode resistor 131, suitably bypassed for chrominance signal frequencies by capacitor 133, across which appears a positive-going "late" pulse output for direct application to pulse output terminal +L. The burst separator tube 130 is also provided with a low frequency anode load including an anode resistor 141, suitably bypassed for chrominance signal frequencies by capacitor 143, across which appears a negative-going "late" pulse output for direct application to pulse output terminal —L.

As the foregoing demonstrates, the pulse amplifier tube 111 and burst separator tube 130 together provide suitable sources of both polarities of both "early" and "late" pulses. The utilization of these pulses is as follows: The positive-going "early" pulses appearing at terminal +E are applied to the cathode of chrominance amplifier tube 61 to cut off tube 61 during the early portion of the horizontal retrace interval. The negative-going "early" pulses appearing at terminal —E are applied via capacitor 114 to the commonly connected cathodes of tubes 180R, 180B, and 180G of matrix amplifier 43 to drive these tubes into grid current conduction during the early retrace interval portion. As a result, the respective grid capacitors 181R, 181B, and 181G develop a charge which is maintained until the next early retrace interval portion, the charge establishing a truly stable bias which assures production of color-difference signal outputs with reliable D.C. levels. The negative-going "late" pulses appearing at terminal —L are also applied (via capacitor 144) to the cathodes of the matrix amplifier tubes to drive the anodes thereof in the negative direction sufficiently to maintain retrace blanking in the reproducer 25 during the "late" retrace portion. The positive-going "late" pulses appearing at terminal +L are applied (1) via capacitor 91 to the third grid 66 of the chrominance amplifier tube 61 to assure electron flow to the anode 67 during the burst interval, even under the color killed condition; and (2) via capacitor 163 to the control grid 153 of the burst detector tube 150 to permit conduction in the burst detector tube 150 only during the burst interval.

The results of the foregoing pulse applications are the following: The "early" pulse blanking of chrominance amplifier tube 61 assures provision of a "clean" signal to the matrix amplifier 43 during the application thereto of the grid current producing "early" pulses from the anode of triode 111, whereby D.C. stabilization of the color difference signal outputs of matrix amplifier 43 is accurately achieved. Restriction of the chrominance amplifier tube 61 blanking to the early portion of the retrace interval permits use of the technique of positive pulsing of grid 66 during the "late" burst interval to assure unkilling capability. Positive pulsing of the grid 153 of detector tube 150 only during the "late" interval aids in achievement of desired noise immunity for burst detector 45. Application of the negative-going "late" pulses from the burst separator anode to the matrix amplifiers 43 during the "late" burst interval serves to prevent a demodulated burst from lighting up the screen of the color reproducer by assuring blanking of the kinescope beams during such interval.

It may be noted that the pulse amplifier 54 in the FIGURE 2 circuit arrangement in addition to its "early" pulse output production, also conveniently serves as a source of negative bias potential for application to the third grid 66 of chrominance amplifier tube 61. The pulse amplifier tube 111 responds to the periodic application of positive keying pulses on its grid by developing, via grid leak bias action, a negative D.C. potential on its grid. By inserting a pair of voltage regulator devices VR1 and VR2 in series with the grid leak resistor 117, a reliably steady negative potential source is made available for the bias use. A potentiometer 181 is shunted across the voltage regulator pair, and the resistor 89 is connected between third grid 66 and the adjustable tap on the potentiometer 181, whereby selection of the magnitude of the negative bias potential to be applied to grid 66 is permitted. It will be readily seen that the potentiometer 181 thus provides a convenient color killer threshold control. Resistor 183 is connected in series with a third voltage regulator device VR3 between third grid 66 and the junction between VR1 and VR2 to further assure the stability of the selected negative D.C. potential. The presence of VR3 also serves to prevent third grid 66 from ever going more positive than its maximum positive potential rating.

A neutralizing problem may be presented where, as in FIGURE 2, the burst separator input and the color demodulator inputs are derived from the same amplifier output. Thus, for example, if triodes are used as the color demodulators, local oscillations applied to the triodes may readily find a path through interelectrode capacitances of the triodes to the common take-off point, and thus appear in the burst channel to disturb synchronization. To neutralize this undesired feedback, a neutralizing circuit 190 is provided between the anode of the oscillator tube 170 and the chrominance signal input terminal S of demodulators 31 to cancel out the undesired feedback signals.

In a particular working example of the circuitry of FIGURE 2, circuit constants in accordance with the table below were employed with satisfactory results (the values for circuit elements not listed below being the same as those employed for corresponding circuit elements in the aforementioned CTC–10 color receiver):

| | | | |
|---|---|---|---|
| Resistor: | | | |
| **72** | 10K | **121** | 27K |
| **75**____ohms | 47C | **123** | 56K |
| **81** | 15K | **131** | 2.7K |
| **82**____ohms | 220 | **141** | 1.8K |
| **83** | 47K | **159**____ohms | 330 |
| **87**____megohm | 1 | **165**____megohms | 2.7 |
| **89** | 680K | **167**____megohms | 4.7 |
| **90** | 68K | **169** | 100K |
| **112** | 100K | **181**____megohm | 1 |
| **115**____ohms | 6800 | **183** | 100K |
| **117** | 100K | | |
| Capacitor: | | | |
| **70**____mmf | 18 | **125**____mmf | 82 |
| **71**____mmf | 18 | **133**____mmf | 330 |
| **76**____mmf | 330 | **143**____mf | .001 |
| **78**____mmf | 22 | **161**____mmf | 180 |
| **84**____mf | .001 | **163**____mf | .005 |
| **85**____mf | 0.1 | **171**____mf | .047 |
| **113**____mmf | 270 | **173**____mmf | 200 |
| **114**____mf | .22 | **175**____mmf | 27 |
| Tube: | | | |
| **61** | 6DT6 | **150** | ½12AT7 |
| **111** | 6CG7 | **170** | 6GH8 |
| **130** | 6EW6 | | |

What is claimed is:

1. In a color television receiver adapted to produce color images in response to received composite color television signals including a luminance component, a chrominance component, and a periodically recurring color synchronizing component, said luminance and chrominance components being regularly interrupted during recurring retrace intervals having respective early and late portions, said color synchronizing component appearing in said composite signals during said late retrace interval portions; apparatus comprising the combination of means for amplifying the chrominance and color synchronizing components of said received composite signals to the substantial exclusion of the luminance component thereof, means for variably biasing said amplifying means, a source of pulses timed to occur in substantial time coincidence with said retrace intervals, means responsive to pulses from said source for disabling said amplifying means during times corresponding to the early portion of each of said retrace intervals, and additional means responsive to pulses from said source for enabling the operation of said amplifying means during times corresponding to the late portion of each of said retrace intervals independently of the biasing of said amplifying means effected by said variable biasing means.

2. In a color television receiver including a chrominance amplifier device, a burst separator responsive to the output of said chrominance amplifier device, color demodulating means also responsive to said output of said chrominance amplifier device, and a matrix amplifier responsive to the output of said color demodulating means and including a plurality of interconnected amplifying devices; apparatus comprising the combination of a source of pulses occurring during recurring horizontal retrace intervals, means coupled to said pulse source for developing first and second pulse outputs of mutually opposite polarity comprising pulses confined to successively corresponding early portions of said retrace intervals, additional means coupled to said pulse source for developing third and fourth pulse outputs of mutually opposite polarity comprising pulses confined to successively corresponding late portions of said retrace intervals, means for applying said first pulse output to said chrominance amplifier device in a conduction inhibiting sense, means for applying said third pulse output to said chrominance amplifier device in a conduction enhancing sense, and means for applying both said second and fourth pulse outputs to said matrix amplifier devices in a conduction enhancing sense.

3. Apparatus in accordance with claim 2 wherein said additional pulse output developing means includes said burst separator.

4. Apparatus in accordance with claim 3 also including a burst detector device responsive to a burst output of said burst separator, and means for applying said third pulse output to said burst detector device in a conduction enhancing sense.

5. Apparatus in accordance with claim 2 also including a color image reproducer responsive to the outputs of said matrix amplifier devices, and means for blanking said color image reproducer during said horizontal retrace intervals, said reproducer blanking means comprising said second and fourth pulse output applying means.

6. In a color television receiver including an amplifying channel adapted to develop, during the reception of color television signals, an output comprising a chrominance component occupying recurring picture intervals and a relatively high frequency burst component occupying a portion of recurring synchronizing intervals intervening successive picture intervals, the combination comprising an amplifying device, means for applying the output of said amplifying channel to said amplifying device, a source of pulses having a relatively low repetition rate, means for utilizing said pulses to enable operation of said amplifying device only during times corresponding to the synchronizing interval portions occupied by said burst component, a high frequency load for said amplifying device, a low frequency load for said amplifying device, means for deriving a burst component output from said high frequency load, means for deriving a pulse output from said low frequency load, means responsive to said burst component output derived from said high frequency load for synchronously detecting said burst component, said detecting means including a detector device, and means for utilizing the pulse output derived from said low frequency load for restricting operation of said detector device to said synchronizing interval portions.

7. In a color television receiver including an amplifying channel adapted to develop, during the reception of color television signals, an output comprising a chrominance component occupying recurring picture intervals and a relatively high frequency burst component occupying a portion of recurring synchronizing intervals intervening successive picture intervals, the combination comprising an amplifying device, means for applying the output of said amplifying channel to said amplifying device, a source of pulses having a relatively low repetition rate, means for utilizing said pulses to enable operation of said amplifying device only during times corresponding to the synchronizing interval portions occupied by said burst component, a high frequency load for said amplifying device, a low frequency load for said amplifying device, means for deriving a burst component output from said high frequency load, means for deriving a pulse output from said low frequency load, means responsive to said burst component output derived from said high frequency load for synchronously detecting said burst component, said detecting means including a detector device, means for utilizing the pulse output derived from said low frequency load for restricting operation of said detector device to said synchronizing interval portions, the output of said detecting means being utilized by said amplifying channel in a manner tending to cause disabling of said amplifying channel under predetermined conditions of signal reception, and means for utilizing the pulse output derived from said low frequency load to enable the operation of said amplifying channel during said synchronizing interval portions even under said predetermined conditions of signal reception.

8. In a color television receiver including an amplifying channel adapted to develop, during the reception of color television signals, an output comprising a chrominance component occupying recurring picture intervals and a relatively high frequency burst component occupying a portion of recurring synchronizing intervals intervening successive picture intervals, the combination comprising an amplifying device, means for applying the output of said amplifying channel to said amplifying device, a source of pulses having a relatively low repetition rate, means for utilizing said pulses to enable operation of said amplifying device only during times corresponding to the synchronizing interval portions occupied by said burst component, a high frequency load for said amplifying device, a low frequency load for said amplifying device, means for deriving a burst component output from said high frequency load, means for deriving a pulse output from said low frequency load, an additional low frequency load for said amplifying device, means for deriving a pulse output from said additional low frequency load which is opposite in polarity to the first-named pulse output, means for utilizing the pulse output derived from one of said low frequency loads to enable the operation of said amplifying channel during times corresponding to said synchronizing interval portions under conditions of signal reception inclusive of the reception of monochrome elevision signals having picture intervals lacking the appearance of said chrominance component and intervening synchronizing intervals lacking the appearance of said burst component, a color image reproducer, and means for utilizing the pulse component derived from the other of said low frequency loads to blank said reproducer during times corresponding to said synchronizing interval portions.

9. In a color television receiver including a chrominance amplifier device, color demodulating means responsive to the output of said chrominance amplifier device, and a matrix amplifier responsive to the output of said color demodulating means and including a plurality of interconnected amplifying devices; apparatus comprising the combination of a source of pulses occurring during recurring horizontal retrace intervals, means coupled to said pulse source for developing first and second pulse outputs of mutually opposite polarity comprising pulses confined to successively corresponding early portions of said retrace intervals, burst separator means coupled to said pulse source and responsive to the output of said chrominance amplifier device for developing a burst output, said burst separator means additionally developing separate third and fourth pulse outputs of mutually opposite polarity comprising pulses confined to successively corresponding late portions of said retrace intervals, means for applying said first pulse output to said chrominance amplifier device in a conduction inhibiting sense, means for applying said third pulse output to said chrominance amplifier device in a conduction enhancing sense, and means for applying both said second and fourth pulse outputs to said matrix amplifier devices in a conduction enhancing sense.

References Cited in the file of this patent

UNITED STATES PATENTS

| | | |
|---|---|---|
| 2,892,018 | Baugh | June 23, 1959 |
| 2,894,061 | Oakley et al. | July 7, 1959 |
| 2,917,575 | Heuer | Dec. 15, 1959 |